United States Patent [19]

Jesshope et al.

[11] Patent Number: 5,016,163

[45] Date of Patent: May 14, 1991

[54] PARALLEL PROCESSING SYSTEM INCLUDING CONTROL COMPUTER FOR DIVIDING AN ALGORITHM INTO SUBALGORITHMS AND FOR DETERMINING NETWORK INTERCONNECTIONS

[76] Inventors: Christopher R. Jesshope; Patrick S. Pope, both of Dept. of Electronics and Computer Science, The University of Southampton; Anthony J. G. Hey, Dept. of Physics, The University of Southampton; Denis A. Nicole, Dept. of Electronics and Computer Science, The University of Southampton; Edward K. Lloyd, Dept. of Mathematics, The University of Southampton, all of Highfield, Southampton SO9 5NH, Great Britain

[21] Appl. No.: 140,668

[22] Filed: Jun. 30, 1987

Related U.S. Application Data

[63] Continuation of PCT GB86/00514, Aug. 29, 1986.

[30] Foreign Application Priority Data

Aug. 30, 1985 [GB] United Kingdom ............... 8521672

[51] Int. Cl.$^5$ .......................... G06F 9/06; G06F 9/46; G06F 15/16
[52] U.S. Cl. .................................. 364/200; 364/229.2; 364/229.4; 364/230.5; 364/231.9; 364/238.1; 364/238.2; 364/242.94; 364/262.4; 364/262.8; 364/281.4; 364/284.4; 364/927.96; 364/927.98; 364/931.03; 364/931.46; 364/940.64; 364/940.67; 364/946.2
[58] Field of Search .................................... 370/60; 364/200 MS File, 900 MS File

[56] References Cited

U.S. PATENT DOCUMENTS

| | | | |
|---|---|---|---|
| 3,979,728 | 9/1976 | Reddaway | 364/200 |
| 4,314,349 | 2/1982 | Batcher | 364/716 |
| 4,344,134 | 8/1982 | Barnes | 364/200 |
| 4,365,292 | 12/1982 | Barnes et al. | 364/200 |
| 4,412,303 | 10/1983 | Barnes et al. | 364/900 |
| 4,466,061 | 8/1984 | DeSantis et al. | 364/200 |
| 4,523,273 | 7/1985 | Adams, III et al. | 364/200 |
| 4,546,428 | 10/1985 | Morton | 364/200 |
| 4,587,381 | 5/1986 | Cheetham | 370/60 |
| 4,636,948 | 1/1987 | Gdaniec et al. | 364/300 |
| 4,758,948 | 7/1988 | May et al. | 364/200 |

FOREIGN PATENT DOCUMENTS 0111399 6/1984 European Pat. Off. ............ 364/200

OTHER PUBLICATIONS

R. Taylor, "Signal Processing with Occam and the Transputer", IEEE Proceedings, vol. 131, No. 6, Oct. 1984.

(List continued on next page.)

*Primary Examiner*—David Y. Eng
*Assistant Examiner*—Ayni Mohamed
*Attorney, Agent, or Firm*—Scully, Scott, Murphy & Presser

[57] ABSTRACT

The device 10 comprises a large number of transputers $T_1$ to $T_{16}$ (only $T_1$ and $T_{16}$ are shown), $T_{mem}$, $T_x$, $T_y$, $T_z$, $T_t$. These are divided into a set of working transputers $T_1$ to $T_{16}$, and a set of interface transputers $T_x$, $T_y$, $T_z$, $T_t$ providing input/output facilities for the device, both sets being under the control of a transputer $T_{mem}$.

The transputer $T_{mem}$ receives instructions for the device and breaks them down into programs for parallel processing by the transputers $T_1$ to $T_{16}$. These transputers will normally need to communicate, and the necessary connections are provided by a switch network 12, under the control of the transputer $T_{mem}$.

The programs are so allocated to the transputers $T_1$ to $T_{16}$ and the switch network 12 is so arranged that direct connections are provided between any transputers which must communicate for the execution of their respective programs.

Other connection arrangements are described, including a universal circuit capable of connecting the transputers $T_1$ to $T_{16}$ to form any theoretically possible network.

2 Claims, 10 Drawing Sheets

OTHER PUBLICATIONS

M. Knudsen et al., "MUSEC, Powerful Data-Flow Network of Signal Microprocessors", IEEE Electro, vol. 8, 1983.

H. J. Siegel et al., "High Parallel Processor Array 'PAX' for Wide Scientific Applications", Proc. of 1983 International Conference on Parallel Processing, Aug. 1983.

R. Asbury et al., "Concurrent Computers Ideal for Inherently Parallel Problems", Computer Design, vol. 24, No. 11, Littleton, U.S., Sep. 1985.

M. Lee et al., "Network Facility for a Reconfigurable Computer Architecture", The 5th Inter. Confer. on Distributed Systems, New York, May 1985.

D. Nassimi et al., "Parallel Algorithms to Set Up the Benes Permutation Network", IEEE Trans. on Comp., vol. C-31, No. 2, Feb. 1982.

L. Bhuyan et al., "Generalized Hypercube and Hyperbus Structures for a Comp. Network", IEEE Trans. on Comp., vol. C-33, No. 4, New York, Apr. 1984.

"The NYU Ultracomputer—Designing an MIMD Shared Memory Parallel Computer", IEEE Transactions on Computers, vol. C-32, No. 2, Feb. 1983, A. Gottlieb et al.

"The Extra Stage Cube: A Fault-Tolerant Interconnection Network for Supersystems", IEEE Transactions on Computers, vol. C-31, No. 5, May 1982.

Advances in Computers, "Parallel Processing of Ordinary Programs", vol. 15, 1976, pp. 119-179, Kuck, D. J.

Advances in Computers, vol. 20, 1981, pp. 116-197, "Vector Computer Architecture and Processing Techniques", Hwang et al.

Barron, "The Transputer", The Microprocessor and Its Application, pp. 343-357 (1978).

PARALLEL PROCESSING SYSTEM INCLUDING CONTROL COMPUTER FOR DIVIDING AN ALGORITHM INTO SUBALGORITHMS AND FOR DETERMINING NETWORK INTERCONNECTIONS

CROSS-REFERENCE TO RELATED APPLICATIONS

This is a continuation of International Application PCT/GB86/00514, filed on Aug. 29, 1986, which designated the United States and which claims priority to Great Britain application No. 8521672, filed Aug. 30, 1985.

The present invention relates to data processing devices comprising a plurality of computers.

In the field of data processing devices, great attention has recently been concentrated on multiple computer networks, which have the capability of performing parallel processing. During parallel processing, each of the computers in the network is acting to produce a solution to part of a problem to be solved by the network, and the partial solutions produced by the computers are combined to produce the solution to the whole problem. Parallel processing devices can act more quickly than a single computer executing a single sequence of steps, because of the overlapping in time of the necessary operations. At some stage during processing, one computer may require a result produced by another computer in order to complete its operations, and accordingly, provision is made for the computers to communicate with one another.

Known parallel processing devices can be broadly classified into three types, according to what provision is made for communication between computers. Some devices use a bus to which all computers are connected. Others provide a fixed network of connections between computers, often between each device and its nearest neighbours. Communication between unconnected computers, where necessary, is performed by passing a message along a line of connected computers until the message reaches its destination. Finally, other devices provide a memory common to all the computers, so that messages may be sent by storing them in the memory, for retrieval by another computer. In a common arrangement, the memory is partitioned into blocks and a switch network is provided for connecting any block of memory to any of the computers.

In each of these types of device, the provision for data movement between computers can present problems which limit the processing speed attainable by the device. In the first type, the bus width determines how long a single message takes to be transmitted, and so determines how long another computer may have to wait before it can send a message. In the second type of device, a large number of connections are used for messages between distant, unconnected computers and transmission time can become excessive unless the bandwidth of the connections is larger. In the third type, the switch network presents a bottleneck to data flow in the device, unless the bandwidth of connections to the memory is exceptionally wide.

It is an object of the present invention to provide an improved data processing device in which data flow between its components is minimised and more efficient, and does not seriously retard processing.

According to the present invention there is provided a data processing device comprising a plurality of computers, a switch network for effecting connections between the computers, and control means which, in use, receives an instruction defining an algorithm to be executed by the device, translates the algorithm into subalgorithms for execution in parallel by respective computers, instructs the computers to execute the subalgorithms, and controls the switch network to provide direct connections between any computers which must communicate for the execution of their respective subalgorithms.

Thus, the control means assigns tasks to the computers and links them together so that the connections accurately reflect the data flow necessary for the solution of the problem. A network in which this is the case is called an "algorithmic network" in this specification. In an algorithmic network, connections only exist where they are needed and so data movements are efficient. Accordingly, connections can be narrow, for instance bit-serial links, without seriously reducing the processing speed of the device.

A device according to the invention could be used as part of a larger system. For instance, each of the computers of the known parallel processing devices described above could be replaced by a group of the same type of computers forming a device according to the invention. The processing power of the known device would then be significantly increased.

Furthermore, a number of devices according to the invention could be used as the computers in a larger device which in itself is a device according to the invention. Thus, devices according to the invention can be thought of not only as independent data processing devices, but as building blocks for larger systems, and these larger systems can themselves be used as building blocks for still larger systems.

Preferably, each computer is a transputer, so that the device can be compact. "Transputer" is a term recognized in the art, and used here, to mean a self-contained device having a processor, memory and input and output interface facilities. Modern transputers are single chip devices such as the devices sold by the INMOS Corporation under the device number IMS T424. Preferably the instruction received by the device defines an OCCAM process and the control means translates the OCCAM process into component OCCAM processes for execution by respective computers. The IMS T424 transputer is particularly intended to operate under the OCCAM programming language. Full details of the device and of the language are available from the INMOS Corporation, Colorado Springs, U.S.A., or from INMOS Ltd, Whitefriars, Lewins Mead, Bristol BS1 2NP, England. OCCAM is a trademark of the INMOS Group of companies. Briefly, OCCAM treats an operation as being made up of "processes" which involve a sequence of actions on data and which use data from and provide data for other processes. The means by which two processes communicate is referred to as a "channel". In the formalism of OCCAM, a number of processes may together form a process, in that the group of processes also involves a sequence of actions and also requires input and provides output. Equally, a process may be thought of as being formed of subprocesses, each being a process within the formal definition.

This formalism permits the processes to proceed concurrently, although a process which wishes to communicate with another process may have to wait until the other process has reached an appropriate stage.

The formalism of OCCAM is described in "OCCAM—an overview", "Microprocessors and microsystems", Vol. 8, No. 2, March 1984 (published by Butterwork & Co. (Publishers) Ltd.).

Preferred features of the invention in its first aspect are set out below in claims dependent on claim 1.

In a second aspect, the invention provides a data processing device comprising a plurality of computers operable in parallel, means for providing communication between the computers, and control means controlling the computers and the communication means, each computer being a device according to the first aspect of the invention. Thus, devices according to the first aspect have use both as independent processing devices and as components for the construction of larger devices.

Embodiments of the invention will now be described by way of example and with reference to the accompanying drawings in which.

Figure 1:
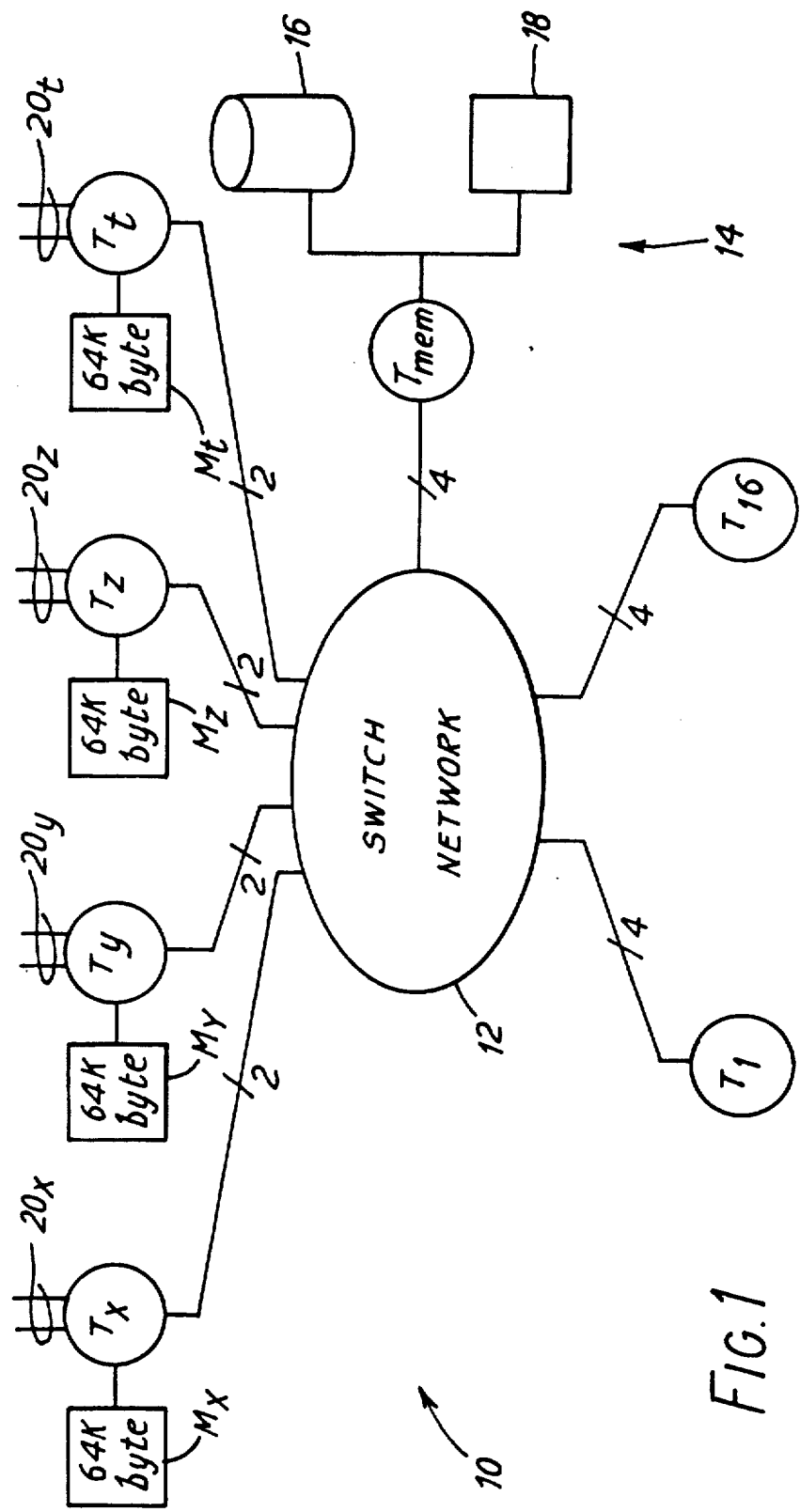
FIG. 1 is a schematic diagram of a first embodiment of a device according to the first aspect of the invention.

FIG. 1 shows a data processing device 10 comprising a plurality of transputers $T_1$, $T_2$ ... $T_{16}$, only two of which are indicated, labelled $T_1$ and $T_{16}$. The device 10 also comprises a switch network 12 for effecting connections between transputers, and control means 14. The control means 14 comprises a transputer $T_{mem}$, which, in use, receives an instruction defining an algorithm to be executed by the device 10 and translates the algorithm into sub-algorithms. Sub-algorithms are algorithms which, when executed in combination, produce results equivalent to the results of execution of the main algorithm. The sub-algorithms are for execution in parallel by respective transputers $T_1$ etc. The control means 14 programs the transputers $T_1$ etc. to execute the sub-algorithms, and controls the switch network 12 to provide direct connections between any transputers which must communicate for the execution of their respective sub-algorithms.

Four transputers $T_x$, $T_y$, $T_z$ and $T_t$ are also connected to the switch network, and provide interfacing between the device and external circuits.

The device 10 is therefore divided into three distinct sets of transputers. Firstly, the transputer $T_{mem}$ is responsible for all control functions within the device 10, including controlling the switch network 12 to provide connections within the device. The transputer $T_{mem}$ also has associated bulk memory whose use it controls. The bulk memory may comprise disc or RAM or any other type of storage. The device shown uses a disc store 16 with a capacity of 100 byte and a solid state store 18, preferably a RAM, with a capacity of 16 byte.

Although only a single control transputer $T_{mem}$ is shown, several co-operating transputers may be required in a device which is required to perform particularly complex tasks, or which consists of a large number of transputers.

The second set of transputers, the transputers $T_1$ to $T_{16}$ perform the data processing within the device. These transputers operate in parallel and are connected by the switch network, under the control of the transputer $T_{mem}$ to form an algorithmic network.

The third set is the interface transputers $T_x$, $T_y$, $T_z$ and $T_t$ which each have an associated 64k byte memory, $M_x$, $M_y$, $M_z$, $M_t$ so that interfacing including buffering is possible. Each transputer $T_x$, $T_y$, $T_z$, $T_t$ provides two outputs, labelled $20_x$, $20_y$, $20_z$, $20_t$.

All of the transputers used in the preferred embodiment are INMOS T424 transputer devices. Each transputer has four bit-serial, duplex input/output ports known as "links". For simplicity, the four links of each device are designed North, South, East and West, respectively. In order that two devices can communicate, two connections are necessary, one for data and one for acknowledgements. The simplicity of the necessary connections makes practicable a switch network which can provide the wide variety of connections necessary to implement an algorithmic network for a useful range of algorithms.

Figure 2:
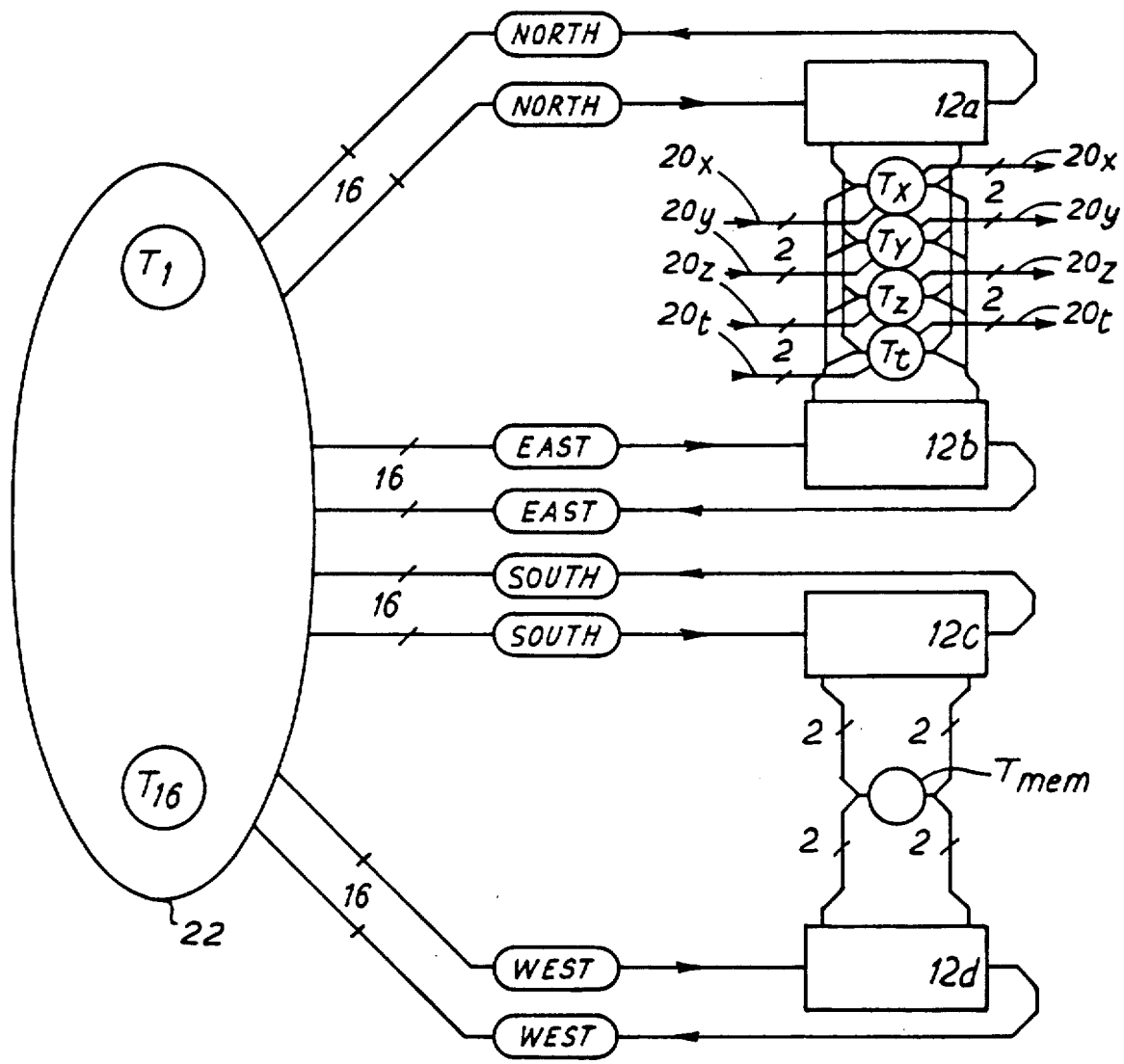
FIG. 2 is a more detailed schematic diagram of the device of FIG. 1.

In FIG. 1, a numeral adjacent a connection indicates the number of duplex channels provided by the connection. In FIG. 2, similar numerals indicate the number of single-bit connections (single wires) provided.

Turning to FIG. 2, the switch network 12 is shown as four distinct switch circuits 12a, 12b, 12c and 12d. The outputs from the North links of the sixteen transputers $T_1$, etc. (shown as a group 22 in FIG. 2) are applied as inputs to the switch circuit 12a, which provides outputs to the inputs of the North links. Similarly, the switch circuits 12b, 12c and 12d are connected between the East, South and West link inputs and outputs respectively.

Figure 3:
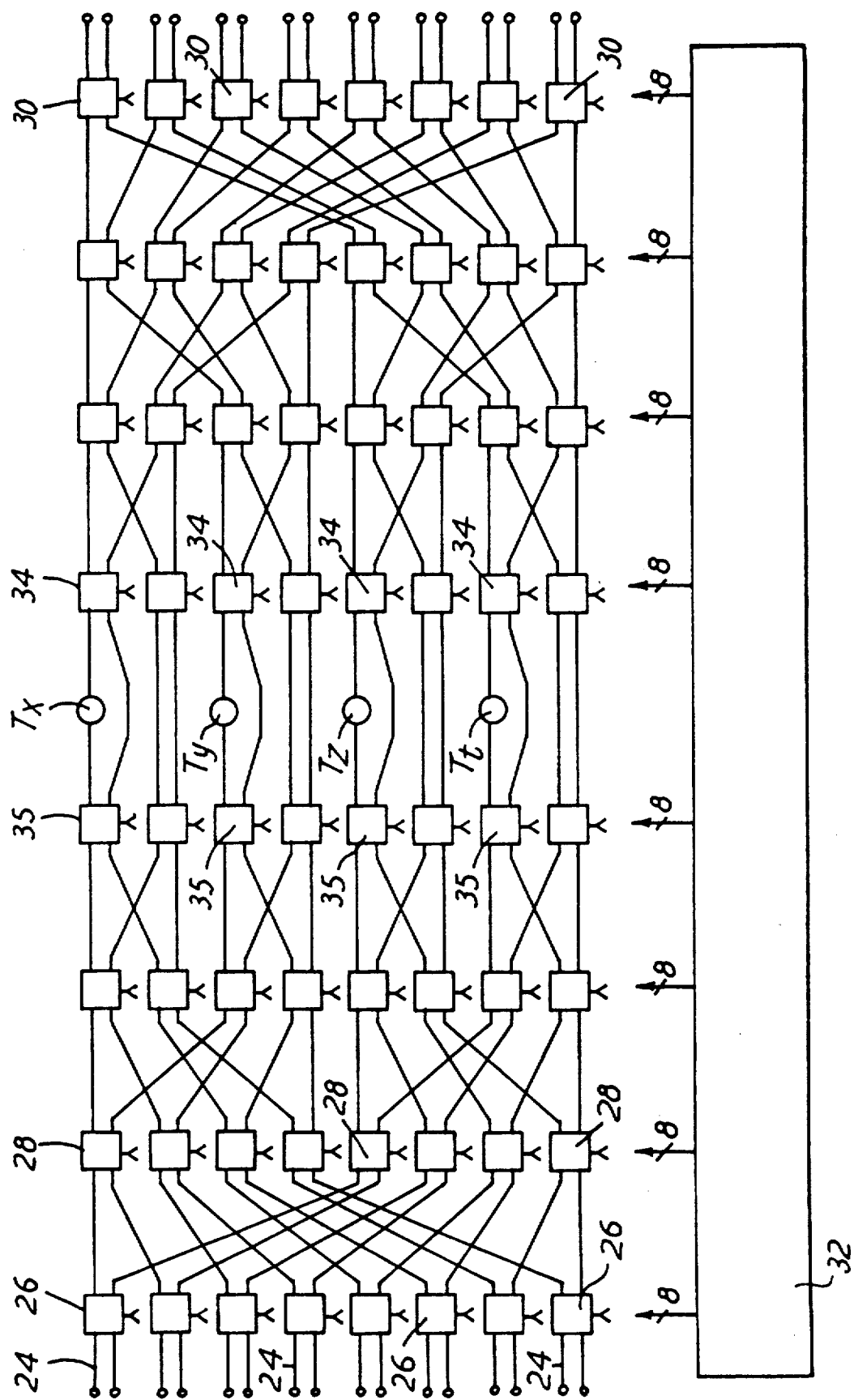
FIG. 3 is a diagram of the switch network 12a of FIG. 2.

FIG. 3 shows the switch circuit 12a in more detail. Sixteen inputs 24 are applied in pairs to a first column of 2-way switching circuits 26. The switching circuits 26 have two outputs to which the inputs may be passed in either permutation. The outputs of each switch 26 are connected to respective inputs of a second column of identical switches 28 whose outputs are passed through further columns of identical switches until the final output of the switch circuit is provided from the righthandmost column of switches 30.

The state of each of the switches is controlled by a control circuit 32. The design of the switch circuit is based on that of a Benes network. A Benes network has $2^n$ inputs and outputs (here n=4) and has the property that it can connect the inputs in any permutation to respective outputs. Therefore, the circuit 12a can connect the North link of any transputer in the group 22 to the North link of any other transputer. The circuits 12b, 12c, 12d provide the same possibilities for connection for the East, South and West links, respectively.

A Benes network and an algorithm for determining the necessary switch states are described in the article "Parallel Algorithms to set up the Benes permutation network", IEEE Transactions on Computers, February 1982. The control circuit 32 is instructed by the control transputer $T_{mem}$ as to the required states of the switches, and the circuit converts this instruction into instructions for each switch.

There is a symmetry in the connection requirements, for the following region. In order to implement a full, duplex link between two transputers $T_1$ to $T_{16}$, two single bit, bit-serial connections must be made, one for data, and one, in the opposite direction, for acknowledgements. Thus, the transputers are paired, each transputer in a pair having the output line of one of its links connected to the input line of the same link of the other transputer in the pair.

Some provision must be made for connecting the transputers of the group 22 to the interface transputers $T_x$, $T_y$, $T_z$, $T_t$ and to the control transputer $T_{mem}$, or to other auxiliary apparatus. This could be done by making connections to inputs and outputs of the switch circuits 12a, 12b, 12c, 12d. However, the size and cost of a switch network of this type increases rapidly with an increase in the number of inputs, the cost varying approximately as the square of the number of inputs. Moreover, the number of inputs and outputs can only be increased by factors of two. This embodiment seeks to maximise the processing power of the device 10 by using all of the inputs and outputs of the switch networks 12a, 12b, 12c, 12d for transputers $T_1$ etc., and to accommodate the remaining transputers as shown in FIG. 3.

An additional column of switches 34 is incorporated in the Benes network. In a normal Benes network, the upper and lower inputs of the switches 34 would be directly connected to the upper and lower outputs respectively. One link of each of the interface transputers $T_x$, $T_y$, $T_z$, $T_t$ is connected between one input of a respective switch 34 and one output of the corresponding switch 35 in the neighbouring column of switches. Thus, a full link can be provided between a transputer $T_1$ to $T_{16}$ and a transputer $T_x$, $T_y$, $T_z$ or $T_t$ by setting the circuit 12a to connect the link of the transputer $T_1$ etc. to itself, by way of a path which incorporates the connection between the appropriate pair of switches 34, 35. A data path for output is provided between an input of the circuit 12a and the interface transputer, and an acknowledge path is provided from the interface transputer to an output of the circuit 12a.

During data input to the device 10, the path from the input 24 to the interface transputer is the acknowledge path and the path from the interface transputer to the output 30 is the data path.

The other output of the switches 35 is directly connected to the other input of the corresponding switch 34. This and other direct connections between the columns of switches 34, 35 enable connections to be made which do not involve the transputers $T_x$, $T_y$, $T_z$, $T_t$.

The connections to the circuit 12a use one link of each of the interface transputers. A second link is used for connections to the circuit 12b, in the same way. The remaining two links of 20x, 20y, 20z, 20t of each of the interface transputers are available for connection to devices external to the device 10.

Connections between the transputers $T_1$ to $T_{16}$ and the control transputer $T_{mem}$ can be provided by the Benes networks 12c and 12d. Each of these networks includes an extra column of switches, as described above in relation to the circuit 12a, but, only two internal connections are broken to provide connections to transputer links. Thus, two links of the control transputer $T_{mem}$ are connected into the circuit 12c, and can be connected to a South link of any of the transputers $T_1$ to $T_{16}$. Another two links of the control transputer $T_{mem}$ are connected into the circuit 12d, for connection to the transputers $T_1$ to $T_{16}$ through their West links.

The design of switch network 12 so far described places some restrictions on the connections which can be made. A link of a transputer from the group 22 can only be connected to the link with the same designation (North, South, East or West) of another member of the group 22. However, since four full links are always available between any pair of transputers in the group 22, this restriction will be acceptable for many applications. Furthermore, the replication of the switch circuits 12a, 12b, 12c, 12d which this restriction makes possible, provides practical advantages of ease of manufacture, which can be offset against the restriction. The four circuits 12a, 12b, 12c, 12d can be manufactured as identical, single-chip devices each having forty connections, namely, 16 inputs, 16 outputs and 8 connections between switches 34, 35 for connection to control or interface transputers.

A further restriction is that the control transputer $T_{mem}$ cannot communicate directly with the interface transputers $T_x$, $T_y$, $T_z$, $T_t$, although data can be passed through a transputer of the group 22. This is not a serious handicap because if wide bandwidth communication is required for speed of data transfer, two links (South and West) of a transputer $T_1$ to $T_{16}$ could be connected to the control transputer $T_{mem}$ at the same time, Similarly, both the North and East links of the transputers $T_1$ to $T_{16}$ can be connected simultaneously to the same interface transputer $T_x$, $T_y$, $T_z$, $T_t$.

Figure 4:
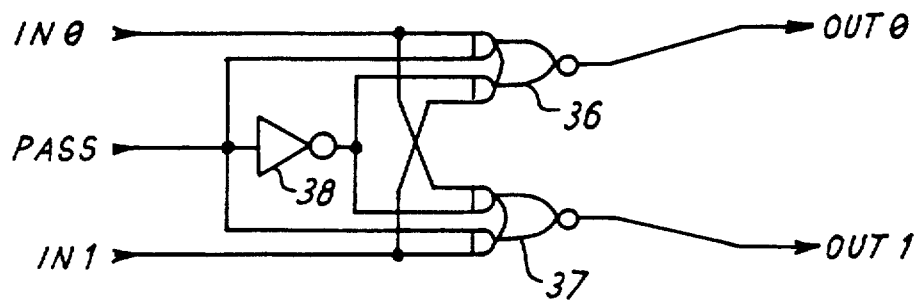
FIG. 4 is a circuit diagram of one switch of the network of FIG. 3.

Turning to FIG. 4, a simple logic circuit is shown for use as a switch in the Benes networks 12a, 12b, 12c, 12d when they are manufactured in semiconductor technology.

The switch circuit has two data inputs IN0 and IN1, a control input PASS and two outputs OUT0 and OUT1.

The outputs are taken from gates 36, 37 which are AND NOR gates, that is, composite gates each consisting of a 2-input NOR gate fed by the outputs of two 2-input AND gates.

The gates 36 receives IN0 and PASS as the inputs to one of its component AND gates, and IN1 and $\overline{PASS}$ (provided by an inverter 38) as the inputs to its other AND gate. The gate 36 provides $\overline{OUT0}$.

The gate 37 receives IN0 and $\overline{PASS}$ at one AND gate and IN1 and PASS at the other AND gate, and provides OUT1.

When PASS=1, IN0 is passed, inverted, to OUT0, and IN1 is passed, inverted, to OUT1. When PASS=0, IN0 is passed, inverted, to OUT1 and IN1 is passed, inverted to OUT0.

The outputs are inverted so that distortions in the shape and timing of signals being transmitted are compensated for. The slew time for a real circuit is usually different for rising and falling signals. Thus, without the use of inversion, a rising input and a rising output applied simultaneously to one of the switch networks 12a, 12b, 12c, 12d would not arrive together at the network outputs. The inversion provided in each switch by the circuit of FIG. 4 ensures that delays caused by slew rates are substantially independent of the input signal and of the route taken through the circuit 12a, 12b, 12c, 12d.

During operation of the device 10, control of the components is effected in the following way. The control transputer $T_{mem}$ receives instructions for the device. In the embodiment described above, these are expressed in the OCCAM language described above, a language to which the INMOS T424 device is particularly suited. The transputer $T_{mem}$ must determine from the instructions how the device should be configured to implement the instructions. The OCCAM instruction, as has already been described, defines an OCCAM process which is itself formed by a number of less complex, intercommunicating OCCAM processes. Each of these less complex processes may be formed by even simpler OCCAM processes, and the depth of this hierarchy of complexity is arbitrary, depending on the complexity of the instruction received by the control transputer $T_{mem}$.

Upon receipt of an instruction, the control transputer $T_{mem}$ breaks the instruction down into component OCCAM processes, which are then allocated to respective transputers $T_1$ to $T_{16}$. The control transputer $T_{mem}$ then configures the switch network 12 so that instructions defining the component processes can be sent to the transputers $T_1$ to $T_{16}$.

Once this has been done, the control transputer $T_{mem}$ sets the state of the switch network 12 so that the network 12 and the transputers $T_1$ to $T_{16}$ form an algorithmic network, and the necessary connections are made to the interface and control transputers $T_x$, $T_y$, $T_z$, $T_t$, $T_{mem}$. The necessary connections can be determined from the originally received OCCAM instruction, which defines the necessary data movements between the composite processes.

When the processes have been allocated, and the switch network 12 set, the device 10 can begin processing data, with the transputers $T_1$ to $T_{16}$ operating in parallel.

The hierarchical nature of OCCAM instructions means that a process to be performed by one of the transputers $T_1$ to $T_{16}$ may itself be a composite of simpler processes, and the transputer will have internal means for determining how to effect performance of these processes, by alternating between them.

In some circumstances, it may be necessary for the connections made by the switch network 12 to be changed during execution of an Each switch circuit 12a, 12b, 12c, 12d contains 64 switches. The state of each switch can be set by one bit, and so that state of one of the circuits 12a, 12b, 12c, 12d can be written as eight bytes. These bytes are sent by the control transputer to the control circuit 32 of each switch circuit 12a, 12b, 12c, 12d. The control circuit 32 send appropriate PASS signals to the switches in the circuit.

Figure 5:
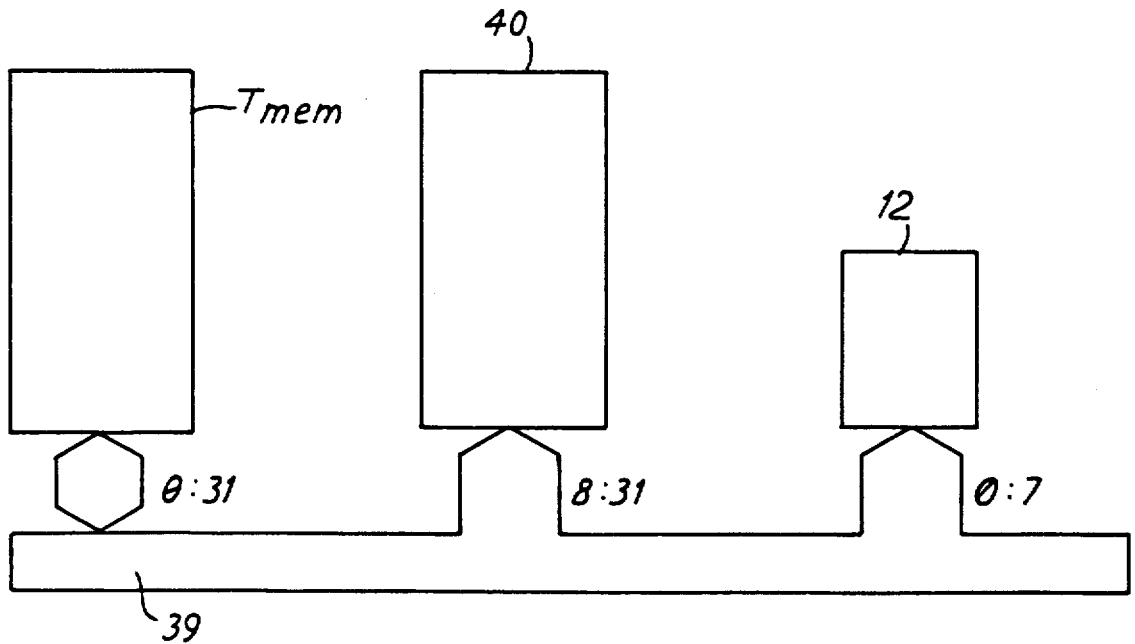
FIGS. 5 and 6 are block diagrams showing how the control transputer controls the switch network of the device and peripherals.
Figure 6:
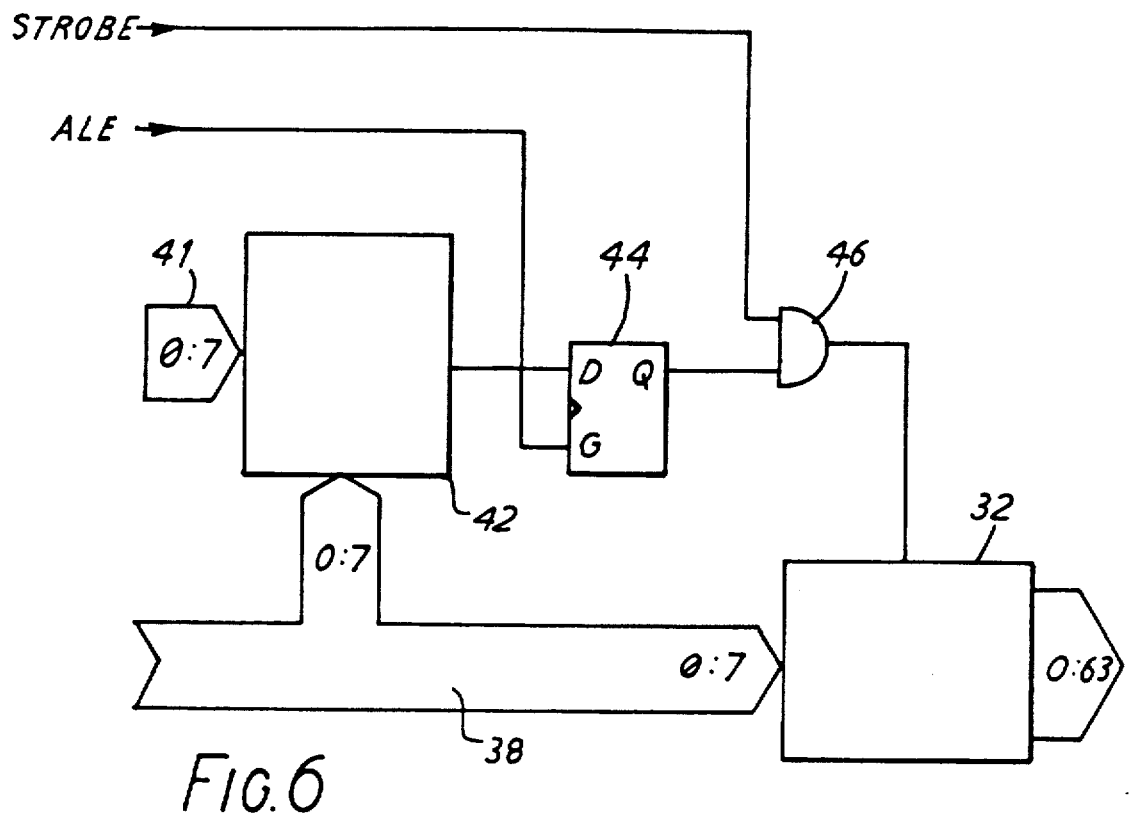

The control transputer $T_{mem}$ may also be in control of peripherals, such as a screen, a keyboard and a floppy disc controller. FIGS. 5 and 6 indicate how control of these and the switch circuits 12a, 12b, 12c, 12d is effected. 64 words of the memory 16, 18 associated with the control transputer are reserved for the peripherals.

The control transputer $T_{mem}$ applies 4 byte address-/data words to a bus 39. The top 3 address bytes are used by a peripheral address decoder 40 to determine when the memory reserved for peripherals is active.

The remaining, lowest order address byte is supplied to the switch circuits 12a, 12b, 12c, 12d. In each switch circuit 12a, 12b, 12c, 12d, within the circuit 32, the lowest order address byte is compared with a hardwired address 41 by a decoder 42 to determine whether data to follow is intended for that circuit. If so, the output of the decoder 42 is applied to gates 44, 46 to allow control signals STROBE and ALE to operate an eight stage, eight bit shift register forming the control circuit 32. This receives and stores 8 bytes, each of which determines the state of one column of switches in the corresponding Benes network. 64 outputs from the circuit 32 go to respective switches, to provide the PASS inputs.

Figure 7:
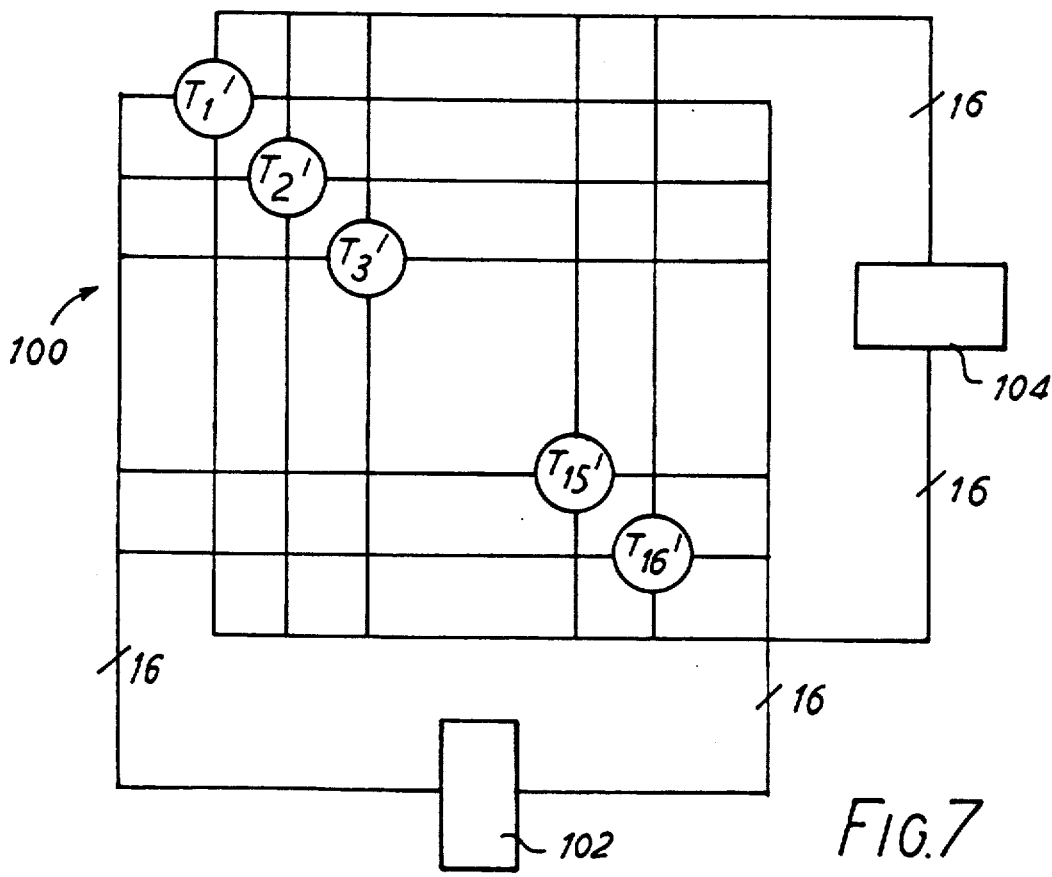
FIG. 7 is a schematic diagram of a second embodiment.

An alternative embodiment of the data processing device is shown in FIG. 7. The device 100 has only two switch circuits 102, 104. Switch circuit 102 makes connections to provide full duplex links between the East and West links of the sixteen transputers $T_{1'}$... $T_{16'}$, corresponding to the transputers $T_1$ to $T_{16}$ of FIGS. 1 etc.

The second switch circuit 104 provides full duplex links between the North and South links of the transputers $T_{1'}$.

The restrictions on connections described above in relation to the first embodiment are overcome by the connection arrangement shown in FIG. 7. Indeed, it can be shown, as will be outlined below, that the arrangement of FIG. 7 has the property of "universality"; that is, that the sixteen computers can be connected to form any theoretically possible network of sixteen nodes and four connections to each node.

Figure 8:
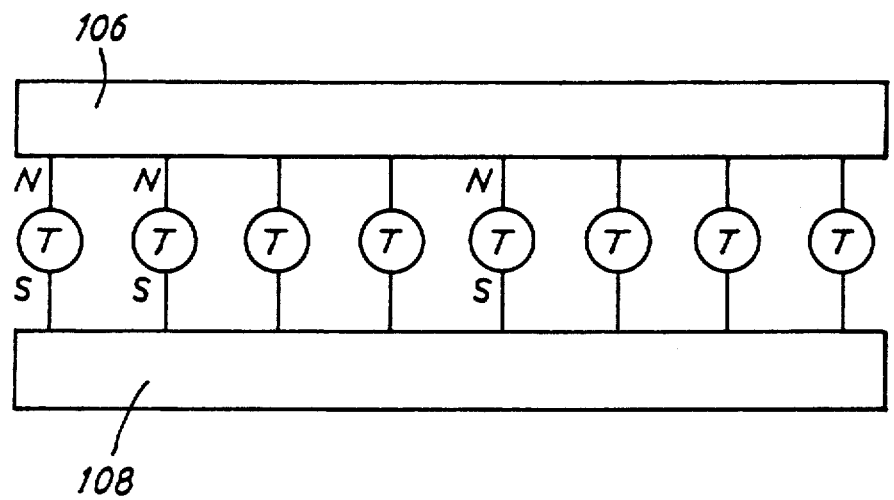
FIGS. 8 to 11 show circuits helpful for understanding the operation of the embodiment of FIG. 7.

Universality can be explained by first considering the simple case of eight transputers, each having two links, called North and South. Turning to FIG. 8, each transputer T has a North link N connected to a switch circuit 106 and a South link S connected to a switch circuit 108. Each switch circuit 106, 108 can connect pairs of its inputs together in any combination.

Figure 9:
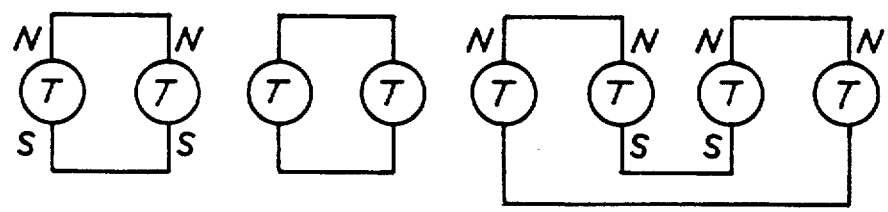

There is only one topologically distinct connected network for a given number of two link transputers. That network has the topology of a simple ring. Thus the general (possibly disconnected) network of a given number of two link transputers has the topology of a set of disconnected rings. Rings of various sizes can be formed by the circuits 106 and 108 of FIG. 8, which is equivalent to the part of the circuit 12 of FIG. 2 which links the processing transputer ports. Here, each switch circuit 106 and 108 is capable of pairing the links connected to it in any combination. One possibility for connecting the eight transputers T is shown in FIG. 9, which shows the connections made by the circuits 106, 108, but not the circuits themselves. In FIG. 9, two rings of two transputers and one ring or four transputers are shown.

Consideration of the connections available, taking into account that North links cannot be connected to South links, shows that rings of any even number of transputers can be formed, but not rings of odd numbers. Thus, the arrangement of FIG. 2 cannot generate all networks of four-link transputers.

Figure 10:
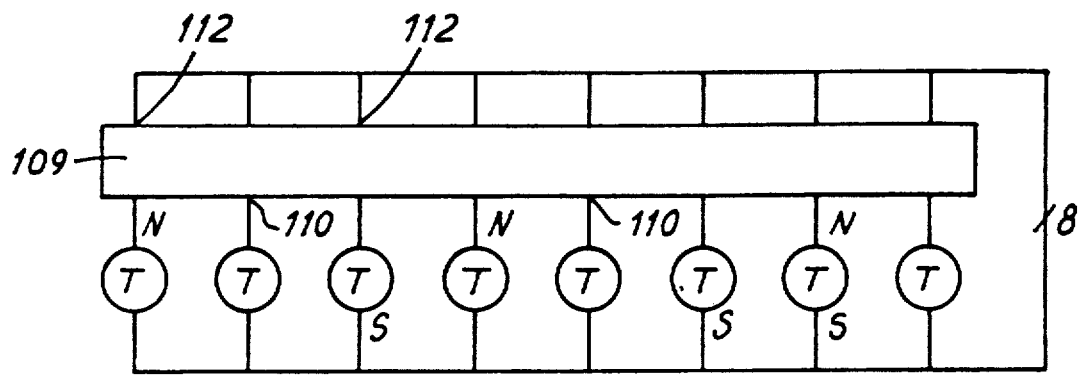
Figure 11:
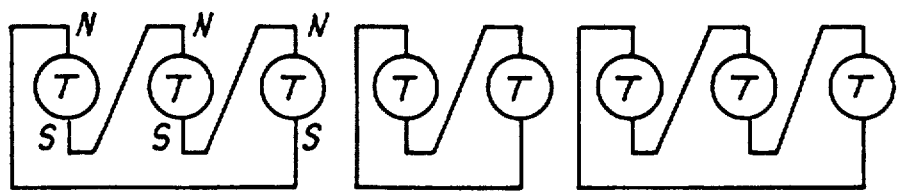

FIG. 10 shows an arrangement of transputers T using a single switch circuit 109. The North links N of the transputers arrive at eight terminals 110 of the circuit 109. The eight links N can be connected by the circuit 109 in any permutation to eight further terminals 112 of the circuit 109. The terminals 112 are connected to the respective South links S. Consequently, the North link N of any transputer T can be connected to the South links S of any other transputer T. North links cannot be connected to North Links, and South links cannot be connected to South Links. A possible set of connections is shown in FIG. 11. FIG. 11 shows that rings of odd and even numbers of transputers can be formed by the arrangement of FIG. 10. In this sense, the arrangement of FIG. 10 is universal for transputers with two links, whereas the arrangement of FIG. 8 is not, because some networks cannot be formed. The arrangement of FIG. 10 permits each individual transputer to be placed in any position in any ring; this arrangement permits the transputers to be labelled, and each labelled transputer to be placed at any specified location in the network. The links cannot be labelled in this sense; the arrangement of FIG. 10 does not permit an arbitrary choice of the individual links used to connect a pair of transputers in the network. One cannot, for example, insist that a pair of transputers be connected by their two North Links.

The "universality" of the arrangement if FIG. 10 can be utilised to provide a universal arrangement for connecting transputers with four (or indeed any higher power of two) links by considering various theorems of Topology concerning Eulerian cycles. A cycle is a closed path along links which visits transputers in turn, arriving along one link and departing along another. An Eulerian cycle traverses each link exactly once; thus in the case of four-link transputers it visits each transputer exactly twice.

For transputers with an even number of links at each node, it is known that all connected networks possess Eulerian cycles. Consequently, any network of connections between the transputers $T_1$ etc. as described above, and which makes connections between all four links of all transputers will have Eulerian cycles.

It is also a known property of Eulerian cycles that simpler cycles can be derived from them, each having fewer connections to each transputer. One may proceed around the Eulerian cycle assigning alternate links to each other of two sets of cycles. For transputers with four links, each of the two resultant sets of cycles will contain every transputer exactly once, and each set of cycles will consist of a set of rings of the type discussed above for two-link transputers.

It may thus be seen that any network of connection between the transputers $T_1$ etc., and which makes connections to all four links of each transputer, can be reduced to two derived (possibly disconnected) networks having the same number of transputers and having two connections to each transputer. Each derived network can be created by an arrangement like that of FIG. 10, which is universal. Consequently, the links of a group of transputers each having four links can be joined in any theoretically possible way which uses all of the links, if the corresponding pairs of links from each transputer are connected to respective switch circuits having the properties of the circuit 109. This includes networks with multiple links joining a single pair of transputers. On this basis it will be apparent that the network can be scaled up to create universal switching networks for transputers which each have a number of links equal to eight, sixteen, or any power of two.

Turning again to FIG. 7, it can be seen that this principle is embodied. The North links of the transputers $T_1$ can be connected in any permutation to the South links of the transputers $T_1$ etc. by the circuit 102 to form the first set of derived cycles. The East links can be joined in any permutation to the West links by the circuit 104 to form the second set of derived cycles. Consequently, by virtue of the topology theorems referred to above, the arrangement of FIG. 7 is universal. Any theoretically possible connected network of connections between all four links of all the transputers can be provided by appropriately setting the circuits 102, 104.

Figure 12:
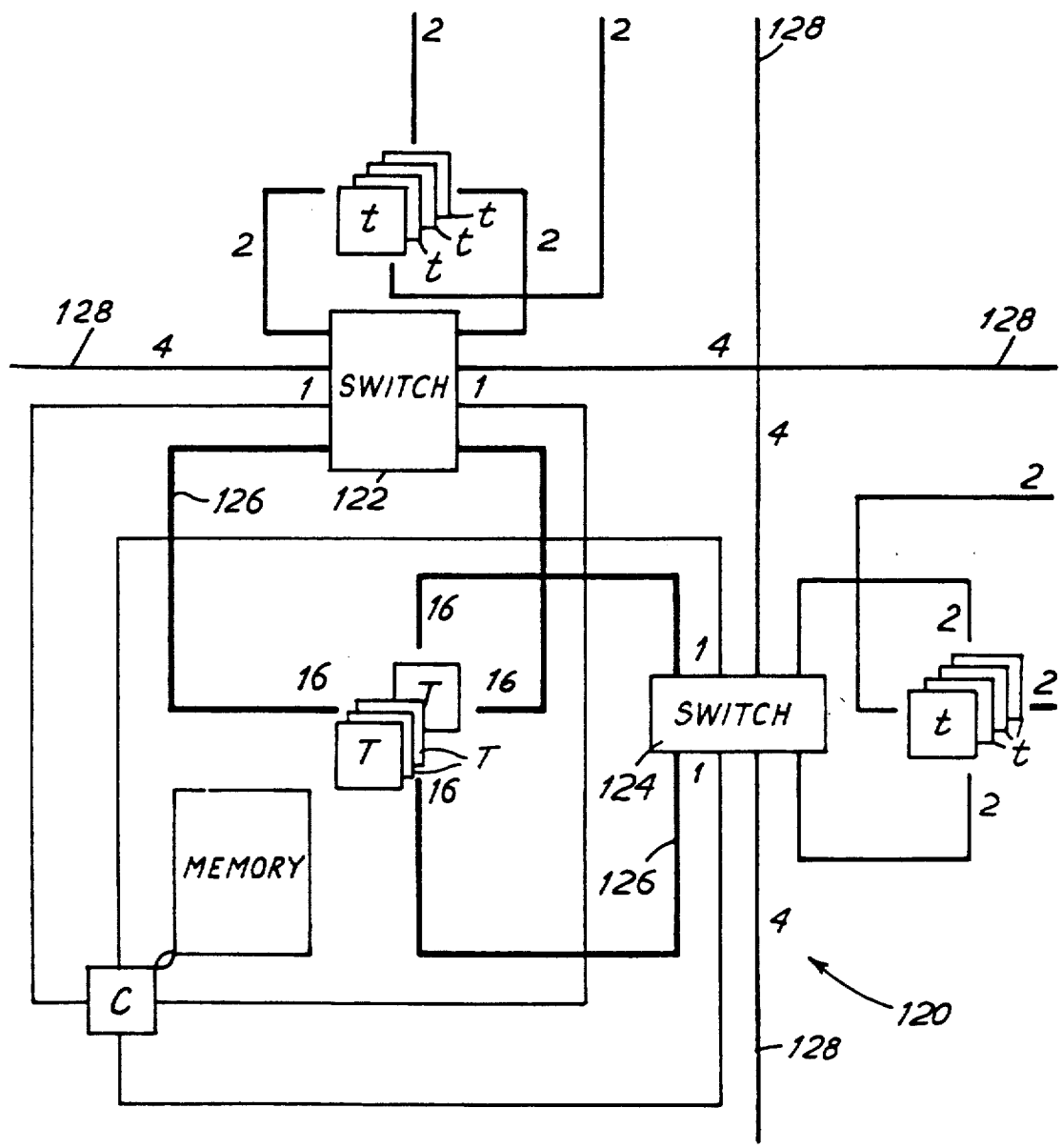
FIG. 12 shows the embodiment of FIG. 7, extended to allow external communication to the device.

FIG. 12 shows schematically a device 120 comprising sixteen transputers T connected as shown in FIG. 7 by two switch circuits 122, 124, and in which provision for external communication is made. Numerals next to connections indicate numbers of duplex links carried by that connection. The numbers of transputers and of external connections are examples only; it is however, in general preferable that the number of external connections from each side of the circuits 122, 124 be approximately equal to half the total numbers of transputers. The switch circuits 122, 124 are extended to provide for connections 126 to other transputers t and connections 128 direct to corresponding switch circuits in other, similar devices. The transputers t correspond to the transputers $T_x$, $T_y$, $T_z$, $T_t$ of FIG. 1. Connections through the switch circuits 122, 124 are also made to a control transputer C having associated bulk memory and corresponding to the transputer $T_{mem}$ of FIG. 1.

The additional connections can be provided in the circuits 122, 124 by providing additional terminals to the circuits, the circuits being able to connect the links in any permutation to the links on the other side. These switch circuits could be pairs of Benes or cross-bar networks. The switching networks would preferably be controlled by a further transputer not shown in FIG. 12.

In FIG. 12, the transputers t have two links connected to the circuit 122 or 124, for connections within the device 120, and two links available for external connection. Alternatively, all four links could be connected to the circuit 122 or 124, with external connections being available only over the connections 128, but controlled by the transputers t.

In use of the device, the control transputer C receives an instruction for the device. The instruction is broken down by the transputer C into instructions for the transputers T, and the necessary network of connections between the transputers T is determined. The network itself is then broken down as described above to find derived networks determining the necessary settings of the circuits 122 and 124. Instructions to the transputers T and, if appropriate, the transputers t are then sent through the circuits 122, 124. Finally, the circuits 122, 124 are instructed to construct the derived networks. Execution of the instruction can then begin. Means by which the control transputer C controls the switch circuits 122, 124 are not shown, but may be similar to those described above in relation to the first embodiment.

Figure 13:
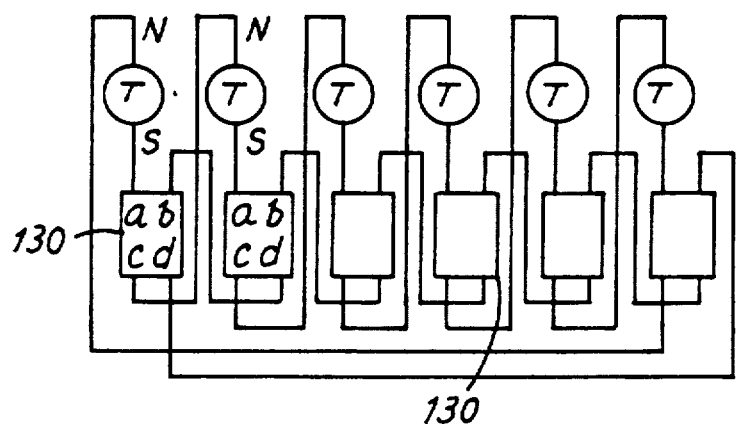
FIG. 13 shows an alternative switching arrangement for the embodiment of FIG. 7.

It has been found that the circuit of FIG. 10 may be replaced by the simpler circuit of FIG. 13, in which the switching is provided by replacing the switch 109 with a set of simple bidirectional two way interchange switches 130. The resultant circuit is still universal, but does not permit the transputers to be "labelled" in the manner described above; the order of two-link transputers in the ring is fixed.

One circuit 130 is provided corresponding to each transputer T. The transputers T form a notional ring. Each circuit 130 has four terminals labelled a, b, c and d. Terminal a is connected to the South link of the associated transputer and terminal c to the North link of the next Transputer in the notional ring. Each terminal b is connected to the terminal d of the next switch in the notional ring. Each circuit 130 has two settings, it may either connect terminal a to c and b to d or may connect a to d and b to c, preferably under the control of a controlling transputer.

Figure 14:
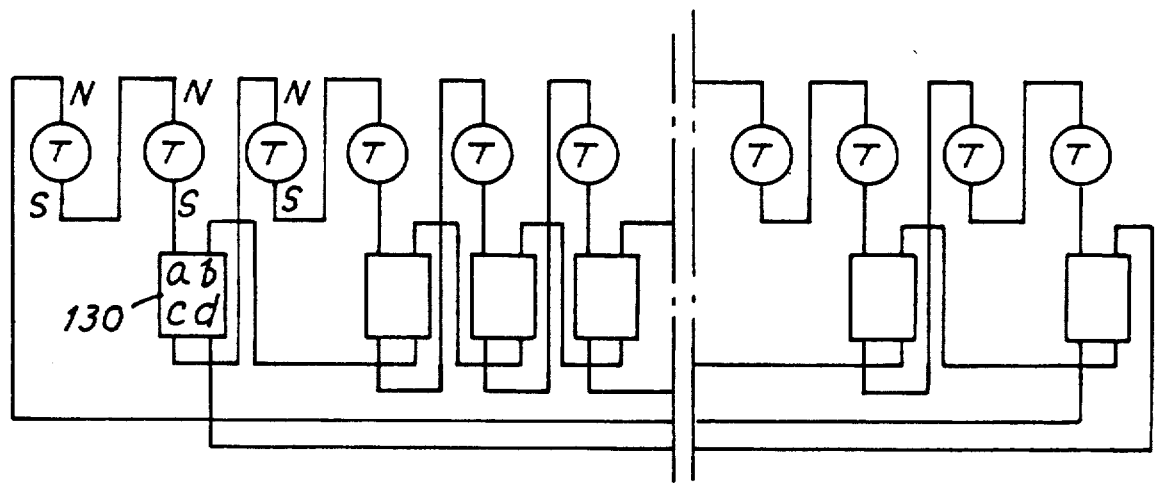
FIG. 14 shows a simplified version of the arrangement of FIG. 13.

The circuit of FIG. 13 may be further simplified to that of FIG. 14, which has several circuits 130 absent as compared with FIG. 13, but is otherwise identical. Similar simplifications can be achieved in networks using different numbers of transputers, by considering the possible partitioning of the set of transputers into rings.

The circuits of FIGS. 13 and 14 may be used to replace the switch 102 or 104 (but not both) in FIG. 10 without loss of universality, but with loss of labelling. If, however, the switch circuit of FIG. 13 is used, it remains possible to place any single transputer at an arbitrary chosen point in the network.

Figure 15:
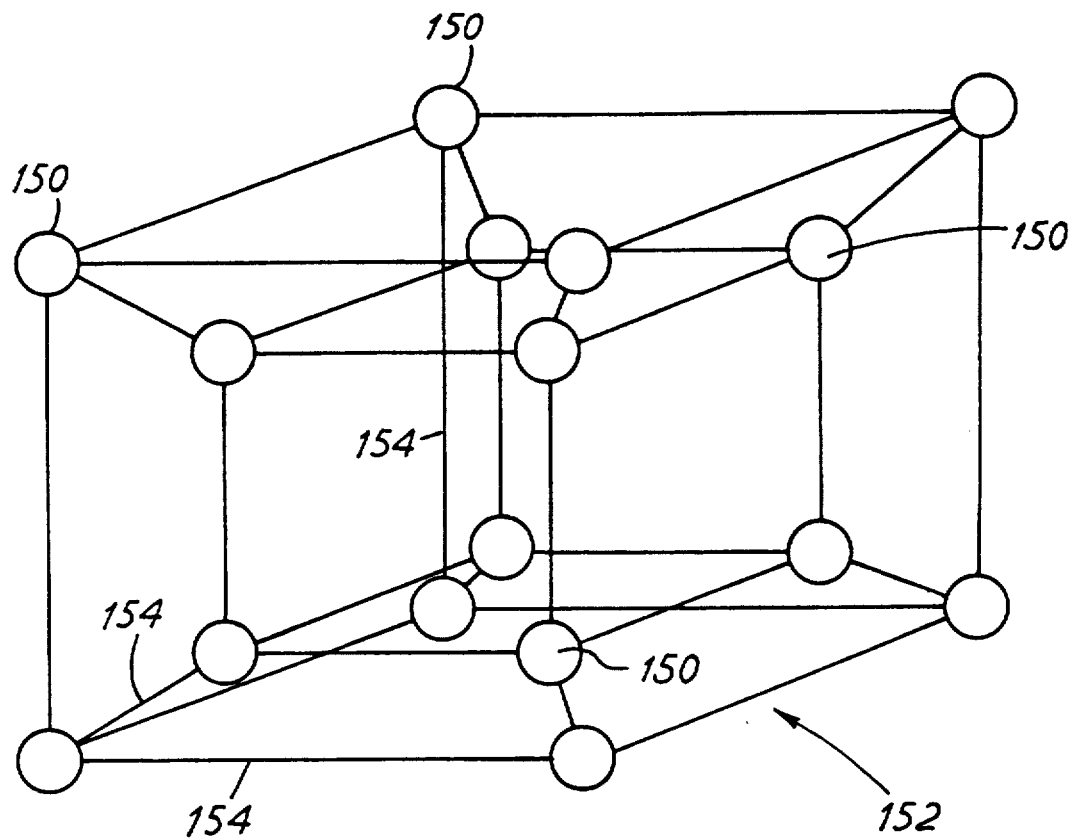
FIG. 15 shows a preferred network for connecting devices to form a larger device.

A number of devices according to any embodiment described above can be combined to form a larger device, by using a network of connections between the devices. A preferred network 152 is shown in FIG. 15. It comprises 16 devices 150 connected to form two cubes, one inside the other. Each device 150 is at the vertex of one of the cubes and is connected by connections 154 to three other devices along cube edges, and to the device 150 at the corresponding position on the other cube. The use here of geometrical terms such as "cube", "edge" etc. is figurative. The geometry of the larger device can be varied, without changing the topology of the connections.

Although several of the embodiments described above use modified Benes networks, many other types of switch network could be used, chosen according to the versatility which the network is required to have, and taking account of practical considerations such as manufacturing costs and the suitability of a particular circuit for implementation in a particular technology. A cross-bar switch network is a possible alternative to the Benes networks.

We claim:

1. A data processing device for performing parallel data processing on an algorithm by a plurality of computers performing the data processing in parallel, comprising:
   a. a plurality of fully programmable data processing computers for performing the data processing in parallel each fully programmable data processing computer having a plurality of input and output ports;
   b. a switch network for effecting connections between the plurality of data processing computers; and
   c. a control computer means including;
      means for receiving instructions defining an algorithm to be executed, said algorithm comprising at least a number of subalgorithms which may be executed concurrently,
      means for translating the algorithm into said subalgorithms for execution in parallel by said plurality of data processing computers,
      means for programming the data processing computers to execute the subalgorithms, and
      means for controlling the switch network to provide direct connections between the data processing computers which must communicate for the execution of their respective subalgorithms, and
   wherein said switch network comprises at least one switch circuit having a first and a second plurality of connections for respective computer ports, and the switch network configuration being controlled by the control computer means to connect the first plurality of connections in any permutation to the second plurality of connections, and
   wherein at least some of the computers each have first and second data ports, all of the first ports being connected to respective connections of said first plurality of connections, and all of the second ports being connected to respective connections of said second plurality of connections, and
   wherein at least some of the data processing computers form a group, each data processing computer having a plurality of pairs of data ports and wherein corresponding pairs of data ports from each data processing computer of the group are connected to respective common switch circuits, with the ports of each pair being connected, respectively, to one of a first plurality of connections to one of said circuits and to one of a second plurality of connections of said one of said circuits.

2. A data processing device according to claim 1, wherein each data processing computer of said group has a number of ports for connection to other data processing computers of the group, said number of ports being a power of two, and wherein the control means determines the network of connections required between the members of the group for the execution of the algorithm, derives from said network a set of derived networks equivalent to the said network, each derived network requiring only two connections to any computer, and controls each switch circuit to connect ports of one or more data processing computers with corresponding ports to any other data processing computer to configure the data processing computers as a respective derived network.

* * * * *

UNITED STATES PATENT AND TRADEMARK OFFICE
CERTIFICATE OF CORRECTION

PATENT NO.   : 5,016,163

DATED        : May 14, 1991

INVENTOR(S)  : Christopher R. Jesshope, et al.

It is certified that error appears in the above-identified patent and that said Letters Patent is hereby corrected as shown below:

```
        Column 4, line 6:    "100 byte"  should read as
--100Mbyte--
        Column 4, line 7:    "16 byte"   should read as
--16Mbyte--
        Column 5, line 10:   "region"    should read as
--reason--
        Column 5, line 63:   after "links" delete --of--
        Column 6, line 35:   "time,"     should read as --time.--
        Column 6, line 49:   "gates"     should read as
--gate--
        Column 7, line 48:   after "an" insert --operation.--
        Column 7, line 51:   "that"      should read as --the--
        Column 7, line 54:   "circuit"   should read as
--circuits--
        Column 9, line 63:   "T_1"       should read as --T_1'--
        Column 9, line 65:   "T_1"       should read as --T_1'--
```

Signed and Sealed this

Twenty-fourth Day of November, 1992

Attest:

DOUGLAS B. COMER

Attesting Officer            Acting Commissioner of Patents and Trademarks